US012113410B2

(12) United States Patent
Kim et al.

(10) Patent No.: US 12,113,410 B2
(45) Date of Patent: Oct. 8, 2024

(54) MOTOR ASSEMBLY AND METHOD OF MANUFACTURING THE SAME

(71) Applicant: Samsung Electronics Co., Ltd., Suwon-si (KR)

(72) Inventors: Minsung Kim, Suwon-si (KR); Kwanwoo Hong, Suwon-si (KR); Jeonghoon Kang, Suwon-si (KR); Sung Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 17/808,462

(22) Filed: Jun. 23, 2022

(65) Prior Publication Data

US 2023/0023540 A1 Jan. 26, 2023

Related U.S. Application Data

(63) Continuation of application No. PCT/KR2022/004158, filed on Mar. 24, 2022.

(30) Foreign Application Priority Data

Jul. 26, 2021 (KR) .................. 10-2021-0097959

(51) Int. Cl.
*H02K 15/16* (2006.01)
*H02K 7/16* (2006.01)

(52) U.S. Cl.
CPC .............. *H02K 15/165* (2013.01); *H02K 7/16* (2013.01)

(58) Field of Classification Search
CPC ........... H02K 15/165; H02K 7/16; H02K 7/04
See application file for complete search history.

(56) References Cited

U.S. PATENT DOCUMENTS

| 8,784,058 | B2 | 7/2014 | Schneider et al. |
| 10,638,900 | B2 | 5/2020 | Hayamitsu |
| 2001/0010435 | A1* | 8/2001 | Kikuchi ................... H02K 7/04 310/67 R |
| 2004/0052201 | A1* | 3/2004 | Hong ................. G11B 19/2009 369/264 |

(Continued)

FOREIGN PATENT DOCUMENTS

| CN | 209137069 U | * | 7/2019 |
| CN | 111608854 A | | 9/2020 |

(Continued)

OTHER PUBLICATIONS

Notification of the International Search Report and the Written Opinion of the International Searching Authority dated Jun. 27, 2022 in connection with International Patent Application No. PCT/KR2022/004158, 11 pages.

*Primary Examiner* — Jeffrey T Carley
*Assistant Examiner* — Jose K Abraham

(57) ABSTRACT

A method of manufacturing a motor assembly comprising a motor and an impeller coupled to a rotation shaft of the motor, the method includes disposing a plurality of balls in a ring-shaped groove formed in a surface of the impeller; rotating the impeller at a speed greater than a resonant rotation speed to move the balls to a compensation position for compensating for an eccentricity in the motor assembly; and fixing the balls at the compensation position in the groove.

14 Claims, 24 Drawing Sheets

(56) References Cited

U.S. PATENT DOCUMENTS

| | | | | |
|---|---|---|---|---|
| 2007/0131027 A1* | 6/2007 | Otten | .................. | H02K 15/165 |
| | | | | 73/66 |
| 2009/0151450 A1* | 6/2009 | Angantyr | ............. | H02K 15/165 |
| | | | | 73/487 |
| 2014/0154114 A1* | 6/2014 | Seok | ........................ | H02K 9/06 |
| | | | | 417/410.1 |
| 2017/0033649 A1* | 2/2017 | Goto | ................... | H02K 15/165 |
| 2018/0245601 A1* | 8/2018 | Hayamitsu | .......... | F04D 25/0613 |
| 2018/0266440 A1* | 9/2018 | Shiozawa | ............. | F04D 29/403 |
| 2022/0069665 A1* | 3/2022 | Noh | ........................ | H02K 9/04 |

FOREIGN PATENT DOCUMENTS

| | | | | |
|---|---|---|---|---|
| DE | 10223377 A1 * | 12/2003 | ............... | H02K 7/04 |
| DE | 112007001445 T5 * | 11/2009 | ........... | H02K 15/165 |
| JP | 2005-094983 A | 4/2005 | | |
| JP | 2005-188325 A | 7/2005 | | |
| JP | 2013-060894 A | 4/2013 | | |
| JP | 5440554 B2 | 3/2014 | | |
| JP | 2017-089610 A | 5/2017 | | |
| JP | 2019-203451 A | 11/2019 | | |
| KR | 10-2005-0110071 A | 11/2005 | | |
| KR | 10-1295361 B1 | 8/2013 | | |
| KR | 10-2020-0064557 A | 6/2020 | | |
| WO | 20094280 A1 | 5/2020 | | |

\* cited by examiner

MOTOR ASSEMBLY AND METHOD OF MANUFACTURING THE SAME

CROSS-REFERENCE TO RELATED APPLICATIONS

This application is a Bypass Continuation of International Application No. PCT/KR2022/004158, filed Mar. 24, 2022, which claims priority to Korean Patent Application No. 10-2021-0097959, filed Jul. 26, 2021, the disclosures of which are herein incorporated by reference in their entirety.

BACKGROUND

1. Field

The disclosure relates to a motor assembly and a method of manufacturing the same.

2. Description of Related Art

In general, a vacuum cleaner is a home appliance that sucks air containing foreign substances such as dust by using the vacuum pressure generated by a motor assembly mounted inside a body of the vacuum cleaner, and then filters the foreign substances from the inside of the body.

The motor assembly is a component that determines a suction force of the vacuum cleaner, and includes a motor and an impeller coupled to a rotation shaft of the motor. As the motor assembly is a component that rotates at high speed, even a small deviation in the motor assembly may generate an eccentricity.

For example, even when a rotating body such as the motor, the impeller, a shaft, etc., is precisely processed, a deviation may occur during an assembly process thereof and thus an eccentricity may occur in the motor assembly. When an eccentricity increases, vibration and noise also increase, which may be transferred to the outside of the vacuum cleaner.

SUMMARY

Provided are a method of manufacturing a motor assembly in which an eccentricity in the motor assembly may be compensated for within a short processing time, and the motor assembly and a vacuum cleaner corresponding thereto.

A manufacturing method according to various embodiments of the disclosure, which is a method of manufacturing a motor assembly including a motor and an impeller coupled to a rotation shaft of the motor, includes disposing a plurality of balls in a ring-shaped groove formed in a surface of the impeller, rotating the impeller at a speed greater than the resonant rotation speed to move the balls to a compensation position for compensating for an eccentricity in the motor assembly, and fixing the balls at the compensation position in the groove.

Fixing the balls fixed at the compensation position may be performed using an adhesive to fix the balls at the compensation position.

The adhesive may be injected into the groove before the impeller is rotated, the balls may be moved to the compensation position, by rotating the impeller at the speed greater than the resonant rotation speed, and the balls may be fixed at the compensation position by the adhesive by maintaining a rotation speed of the impeller until the adhesive is hardened.

Before the impeller is rotated, a transparent cover, which is transparent to allow a position of the balls inside the groove to be identified, may be formed to cover the groove, and the compensation position of the balls may be identified through the transparent cover, by rotating the impeller at the speed greater than the resonant rotation speed.

The fixing of the balls at the compensation position may include removing the transparent cover after stopping the impeller, moving the balls to the compensation position in the groove, and fixing the balls at the compensation position using a fixing member by covering the groove with a cover member in which the fixing member is formed.

The fixing member may be spaced apart at equal intervals in a circumferential direction of the groove.

The fixing member may include a pressing member that fixes a position of the ball by pressing the balls.

A thickness of the pressing member before pressing the balls may be greater than a difference between a height from a bottom surface of the groove to an inner surface of the cover member and a diameter of the ball.

The fixing member may include a plurality of protrusions that protrude from an inner surface of the cover member and are arranged at equal intervals in a circumferential direction, and a pair of protrusions adjacent to each other among the plurality of protrusions may be formed on both sides of the balls to limit positional movement of the ball.

A gap between the pair of protrusions may be greater than or equal to a radius of the balls and less than or equal to a diameter of the ball, and a height of a protrusion of the pair of protrusions from an inner surface of the cover member may be greater by a length of 10% to 20% of the diameter of the balls than a difference between a height from a bottom surface of the groove to an inner surface of the cover member and a diameter of the balls.

A motor assembly according to an embodiment of the disclosure includes a motor and an impeller coupled to a rotation shaft of the motor, and the impeller includes a body including a blade and a ring-shaped groove formed in a surface of the body, a cover member configured to cover the groove, a plurality of balls disposed inside the groove, and a fixing member configured to fix the balls inside the groove.

The fixing member may include an adhesive configured to adhere the balls to an inside of the groove.

The adhesive may be formed on an outer circumferential wall inside the groove.

The fixing member may be formed on an inner surface of the cover member and may be spaced apart at equal intervals in a circumferential direction of the groove.

The fixing member may include a pressing member that fixes a position of the ball by pressing the ball.

A thickness of the pressing member before pressing the balls may be greater than a difference between a height from a bottom surface of the groove to an inner surface of the cover member and a diameter of the balls.

The fixing member may include a plurality of protrusions that protrude from an inner surface of the cover member and are arranged at equal intervals in a circumferential direction, and a pair of protrusions adjacent to each other among the plurality of protrusions may be formed on both sides of the balls to limit positional movement of the balls.

A gap between the pair of protrusions may be greater than or equal to a radius of the balls and less than or equal to a diameter of the balls.

A height for a protrusion of the pair of protrusions from an inner surface of the cover member may be greater by a length in a range from 10% to 20% of the diameter of the balls than a difference between a height from a bottom surface of the groove to an inner surface of the cover member and a diameter of the balls.

In a vacuum cleaner including a motor assembly according to an embodiment of the disclosure, the motor assembly includes a motor and an impeller coupled to a rotation shaft of the motor, and the impeller includes a body including a ring-shaped groove formed in a surface of the body, a cover member configured to cover the groove, a plurality of balls formed inside the groove, and a fixing member configured to fix the balls inside the groove.

A motor assembly and a method of manufacturing the same according to the above-described embodiments of the disclosure may compensate for an eccentricity in the motor assembly within a short time by fixing a position of a ball for compensating for eccentricity.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
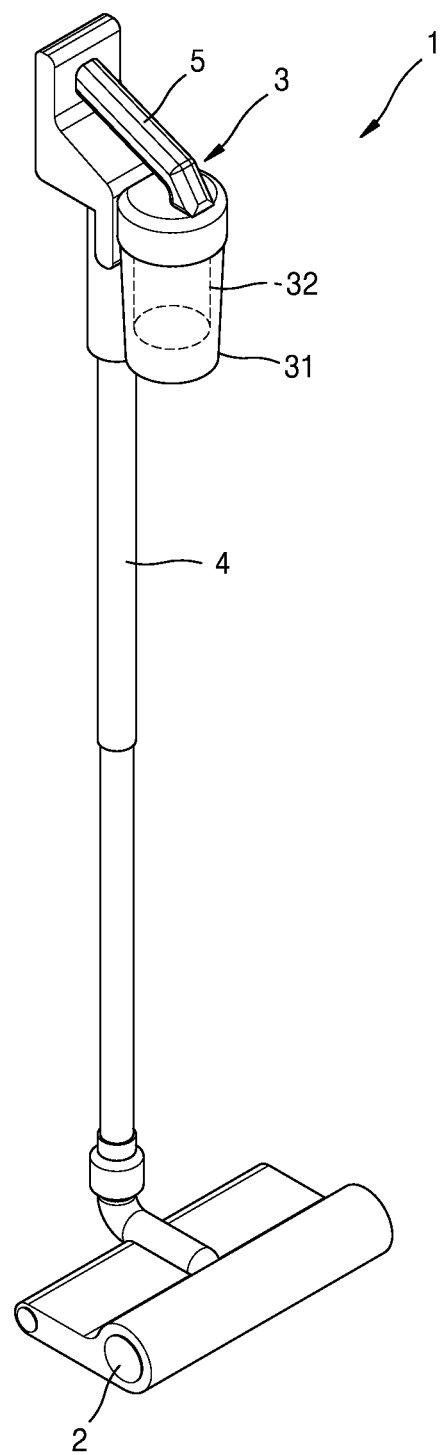
FIG. 1 is a diagram showing a vacuum cleaner according to various embodiments of the disclosure.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

Hereinafter, with reference to details in the attached drawings, example embodiments according to the disclosure will be described in detail. An identical reference numeral or symbol provided in each drawing indicates a part or component performing a substantially identical function.

Although terms including ordinal numbers such as "first", "second", and so forth will be used to describe various components, those components are not limited by the terms. Terms may be used for the purpose of distinguishing one component from another component. For example, a first component may be named as a second component without departing from the right scope of the disclosure, and similarly, the second component may also be named as the first component. The term "and/or" includes a combination of a plurality of related items or any one of the plurality of related items.

The terms used herein have been used for the purpose of describing embodiments only and are not intended to be limiting and/or restricting. As used herein, the singular forms are intended to include the plural forms as well, unless the context clearly indicates otherwise. It will be further understood that the terms "comprises" or "has," when used herein, specify the presence of stated feature, number, step, operation, component, element, or a combination thereof, but do not preclude the presence or addition of one or more other features, numbers, steps, operations, components, elements, or combinations thereof. Identical reference numerals indicated in the drawings refer to members that execute a substantially identical function.

FIG. 1 is a diagram showing a vacuum cleaner 1 according to various embodiments of the disclosure.

Referring to FIG. 1, the vacuum cleaner 1 according to certain embodiments of the disclosure may include a motor assembly 10. The vacuum cleaner 1 may be a wireless cleaner, but may also be a wired cleaner without being limited thereto.

The vacuum cleaner 1 may include a cleaner body 3 and a cleaner head 2. The vacuum cleaner 1 may include a stick 4 connecting the cleaner body 3 to the cleaner head 2, and a handle part 5 connected to the cleaner body 3.

The cleaner body 3 may include a dust bin 31 and a driving unit 32 that are provided therein. The dust bin 31 may store dust or dirt, which is sucked from the cleaner head 2, on a surface to be cleaned. The dust bin 31 may be attachably and detachably connected to the cleaner body 3, and may be separated depending on convenience of a user.

The driving unit 32 may include a motor assembly 10 (see FIG. 2A) provided to drive the vacuum cleaner 1. The motor assembly 10 may generate a suction force inside the cleaner body 3.

Figure 2A:
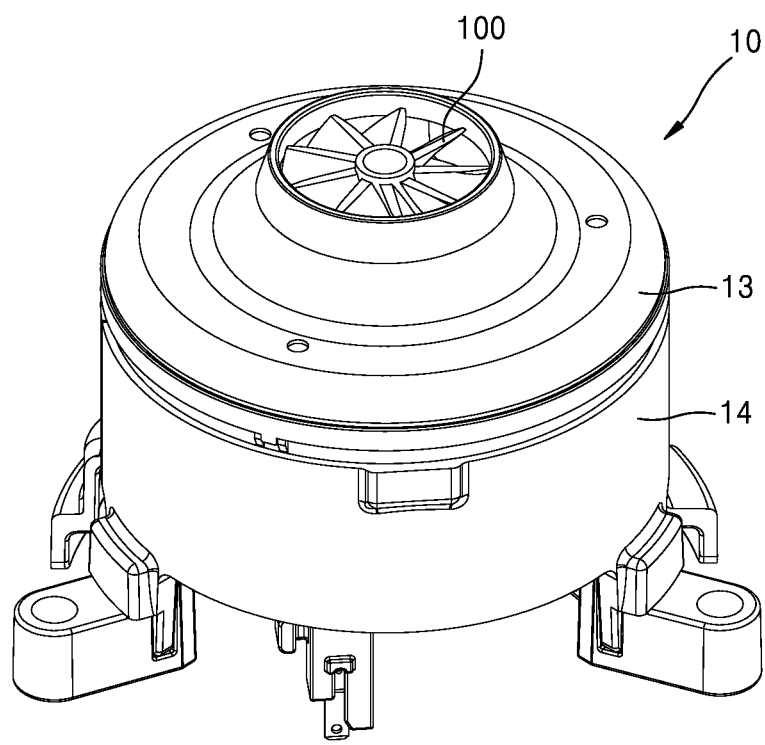
FIG. 2A is an assembled perspective view of a motor assembly according to various embodiments of the disclosure.
Figure 2B:
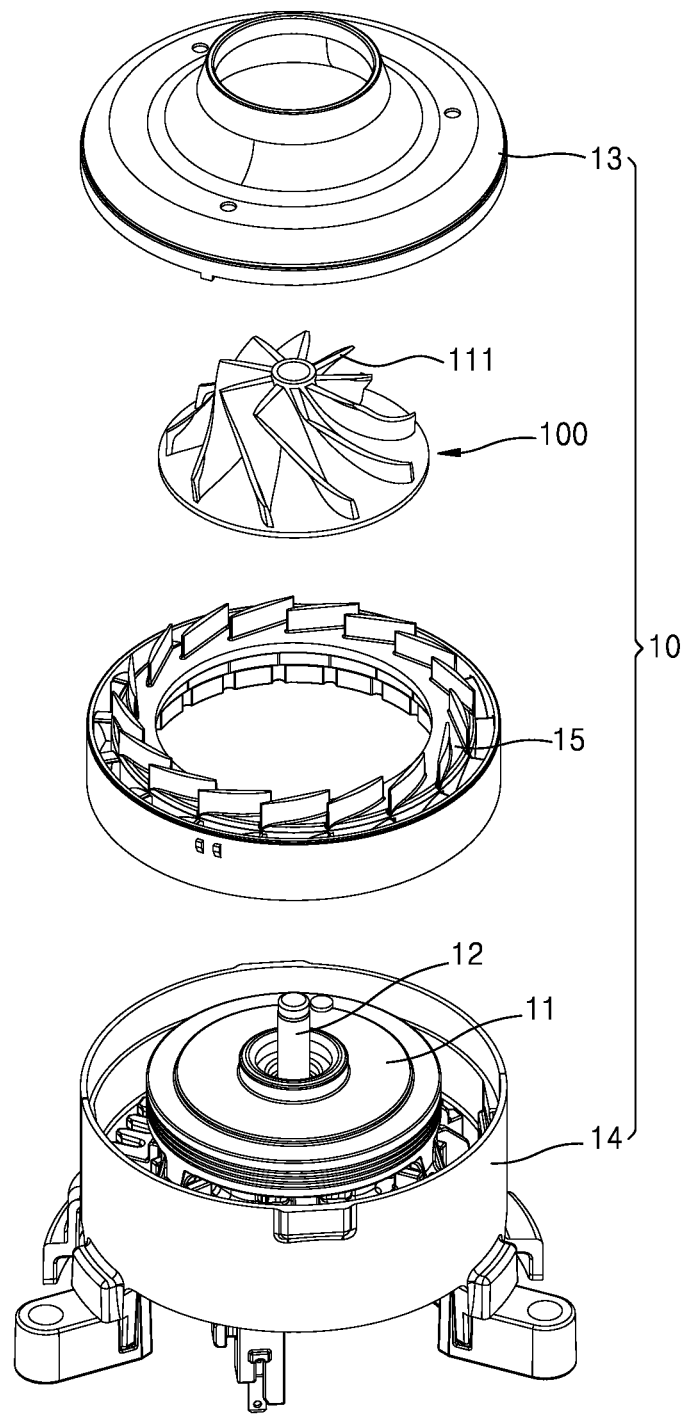
FIG. 2B is an exploded perspective view of a motor assembly according to various embodiments of the disclosure.

FIG. 2A is an assembled perspective view and FIG. 2B an exploded perspective view of the motor assembly 10 according to various embodiments of the disclosure. Referring to FIGS. 2A and 2B, the motor assembly 10 may include a motor 11 and an impeller 100 rotated by the motor 11. The motor assembly 10 may further include cases 13 and 14 that accommodate the motor 11 and the impeller 100 and a guide fan 15 that guides the air sucked by the motor 11.

The motor 11 may rotate the impeller 100 by providing a driving force to the impeller 100 through a rotation shaft 12. The motor 11 may generate a suction force inside the cleaner body 3 by rotating the impeller 100 at a high speed.

The impeller 100 may include a body 110 (see FIG. 3A) that is coupled to the rotation shaft 12 of the motor 11 and has a blade 111. The rotation shaft 12 may be coupled to a coupling hole 113 (see FIG. 3A) formed in the body 110. As the blade 111 is rotated by driving the motor 11, air flow in a certain direction may be generated to generate the suction force inside the cleaner body 3.

As such, to generate the suction force inside the cleaner body 3, the impeller 100 may be rotated at a high speed by the motor 11. However, in the motor assembly 10, eccentricity may occur due to a manufacturing tolerance, an assembly tolerance, etc. For example, a tolerance may occur in an operation of manufacturing the motor 11 and the impeller 100. In addition, even when a rotating body such as the motor 11 and the impeller 100 is manufactured through precision processing, an assembly tolerance may occur in a process of assembling the motor 11 and the impeller 100. As a result, the eccentricity in the motor assembly 10 may occur. When an eccentricity quantity increases, vibration and noise may be generated, which may be transferred to the outside of the vacuum cleaner 1.

The motor assembly 10 according to certain embodiments of the disclosure may include the impeller 100 having a structure capable of reducing or compensating for the eccentricity quantity within a short processing time.

Figure 3A:
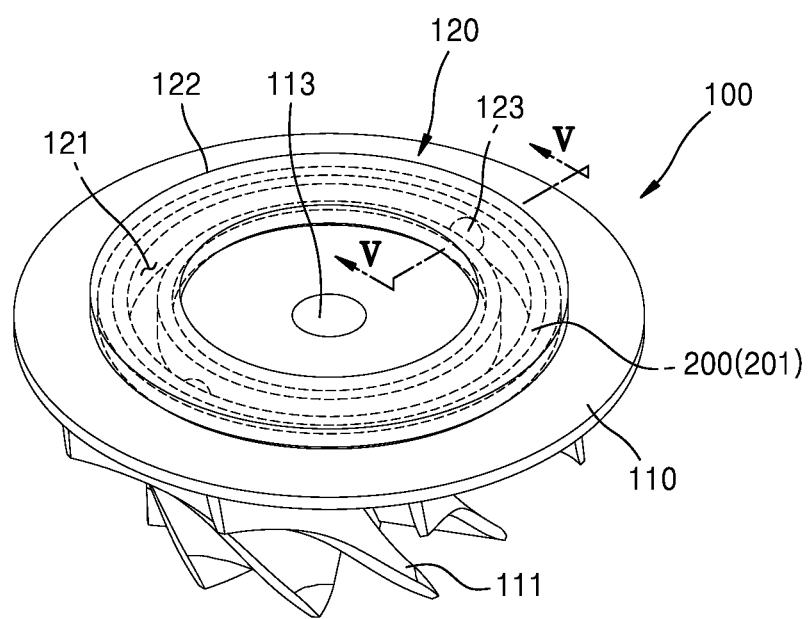
FIG. 3A is an assembled perspective view of an impeller according to various embodiments of the disclosure.
Figure 3B:
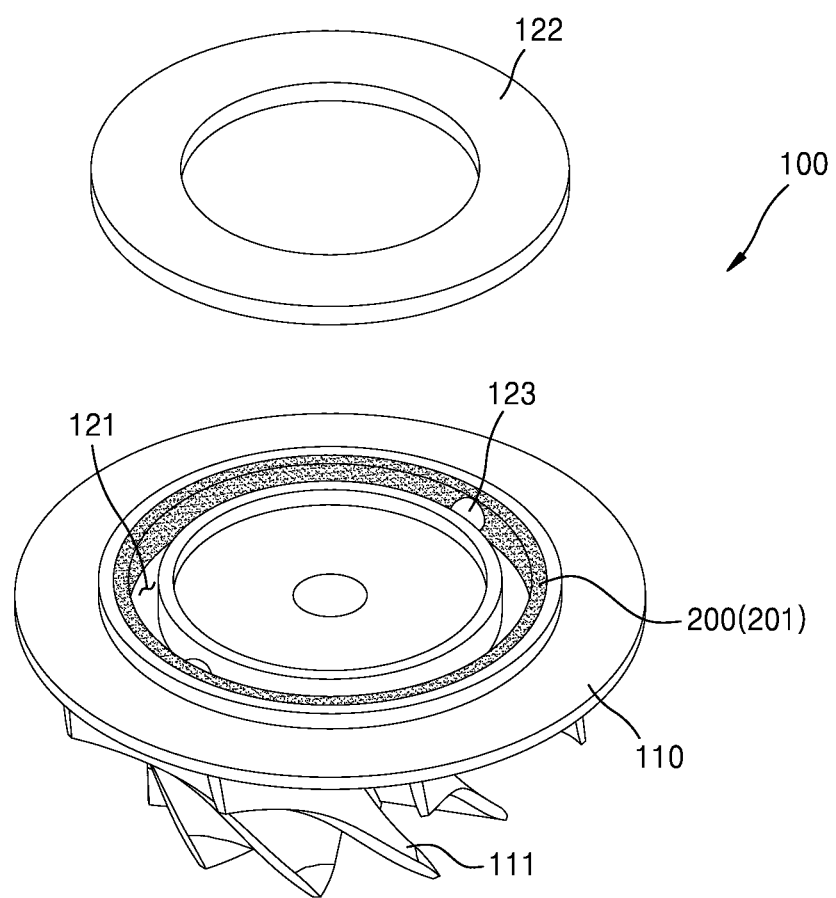
FIG. 3B is an exploded perspective view of an impeller according to various embodiments of the disclosure.

FIGS. 3A and 3B are an assembled perspective view and an exploded perspective view showing the impeller 100 according to various embodiments of the disclosure. Herein, FIG. 3A is a perspective view of the impeller 100 of FIG. 2B viewed from an opposite direction.

Referring to FIGS. 3A and 3B, the impeller 100 may include the body 110 having the blade 111 and a ball balancer 120 formed on a surface of the body 110.

The ball balancer 120 may include a ring-shaped groove 121 formed in a surface of the body 110, a plurality of balls 123 formed inside the groove 121, a cover member 122 covering the groove 121, and a fixing member 200 for fixing the ball 123 at a certain position inside the groove 121.

The groove 121 may be formed at a certain distance from a center of rotation of the impeller 100 and may have a width slightly larger than a diameter D of the ball 123 to allow movement of the ball 123. A difference between the width of the groove 121 and the diameter of the ball 123 may be within approximately 30% of the diameter of the ball 123.

The cover member 122 may prevent foreign substances from entering the groove 121 and prevent the ball 123 inside the groove 121 from falling out. The cover member 122 may have a shape corresponding to the planar shape of the groove 121. For example, the cover member 122 may have a ring-shaped planar shape.

The ball 123 disposed inside the groove 121 may have a certain mass and may be disposed at a compensation position for compensating for the eccentricity in the motor assembly 10.

The fixing member 200 may be formed in a space formed by the groove 121 and the cover member 122, and may fix the ball 123 at the compensation position. As the ball 123 is fixed by the fixing member 200, it is possible to reduce or compensate for the eccentricity quantity of the motor assembly 10 due to the manufacturing tolerance and the assembly tolerance.

In particular, the eccentricity quantity of the motor assembly 10 used in the vacuum cleaner 1 may be determined in the operation of manufacturing the motor assembly 10. That is, the eccentricity quantity of the motor assembly 10 of the vacuum cleaner 1 may be determined in the operation of manufacturing the motor assembly 10, and may be hardly changed in the subsequent operation of using the vacuum cleaner 1.

Thus, the motor assembly 10 according to certain embodiments of the disclosure may stably compensate for the eccentricity even when the ball 123 of the ball balancer 120 is fixed by the fixing member 200.

Figure 4:
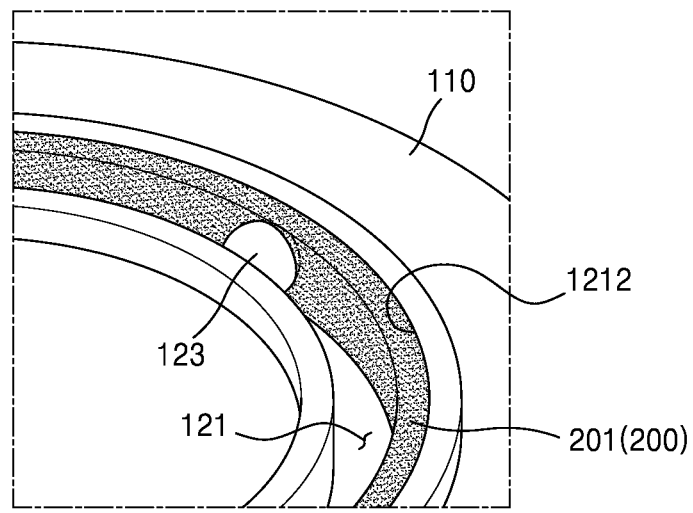
FIG. 4 is an enlarged view of a part of FIG. 3B.
Figure 5:
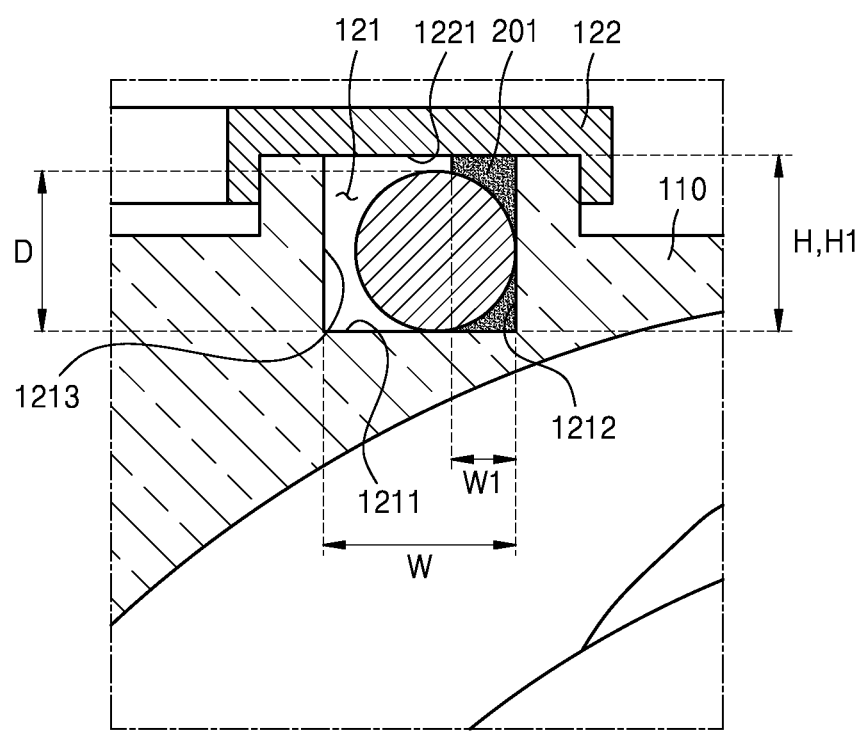
FIG. 5 is a cross-sectional view taken along a line V-V of FIG. 3A.

FIG. 4 is an enlarged view of a part of FIG. 3B, and FIG. 5 is a cross-sectional view taken along a line V-V of FIG. 3A.

Referring to FIGS. 3A, 3B, 4, and 5, the fixing member 200 of the impeller 100 may be an adhesive 201 that adheres the ball 123 to the inside of the groove 121. The adhesive 201 may be disposed on an outer circumferential wall 1212 of the groove 121. The adhesive 201 may have a ring shape partially cut off by the ball 123.

A width W1 of the adhesive 201 may be in a range from approximately 30% to approximately 50% of a total width W of the groove 121. A height H1 of the adhesive 201 may be greater than or equal to the diameter D of the ball 123. The height H1 of the adhesive 201 may be equal to a height of the groove 121. The height H1 of the adhesive 201 may be equal to a height H from a bottom surface 1211 of the groove 121 to an inner surface 1221 of the cover member 122. At this time, the ball 123 may be disposed closer to the outer circumferential wall 1212 than to an inner circumferential wall 1213 of the groove 121.

Figure 6:
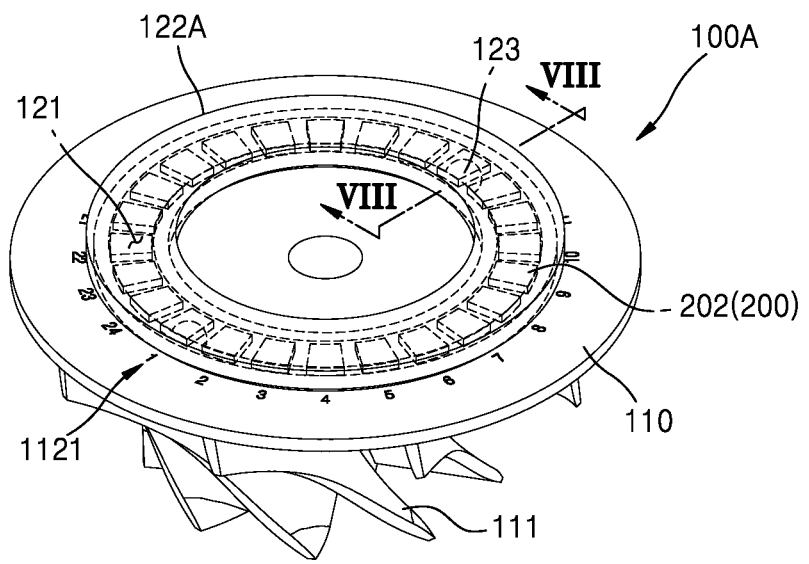
FIG. 6 is an assembled perspective view showing an impeller having a fixing member according to various embodiments of the disclosure.
Figure 7:
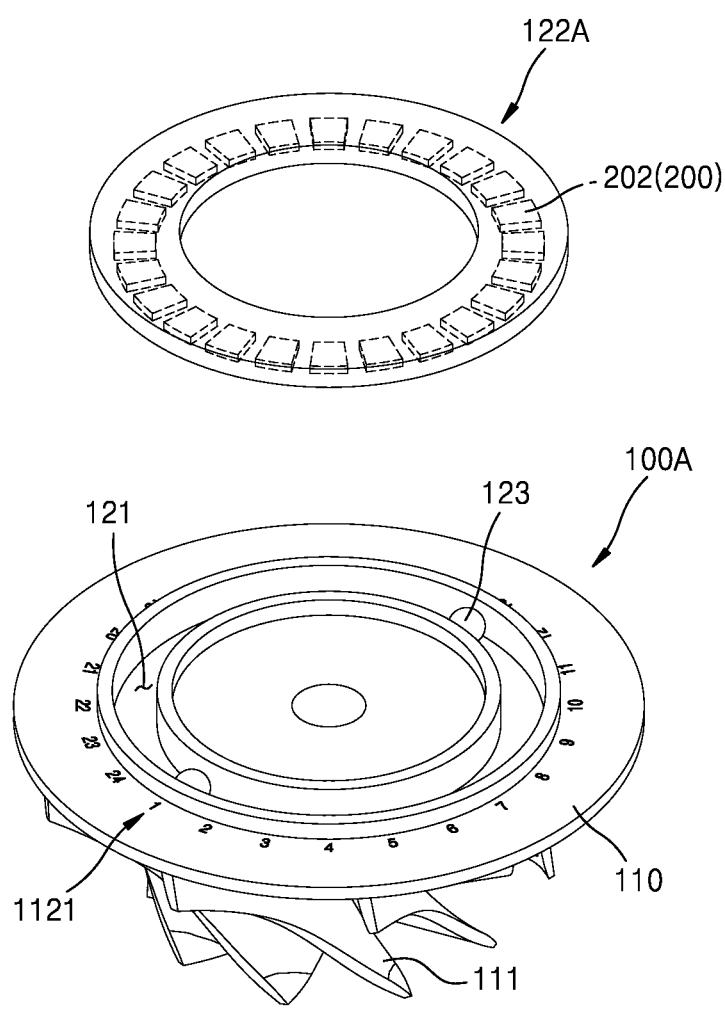
FIG. 7 is an exploded perspective view showing an impeller having a fixing member according to various embodiments of the disclosure.
Figure 8:
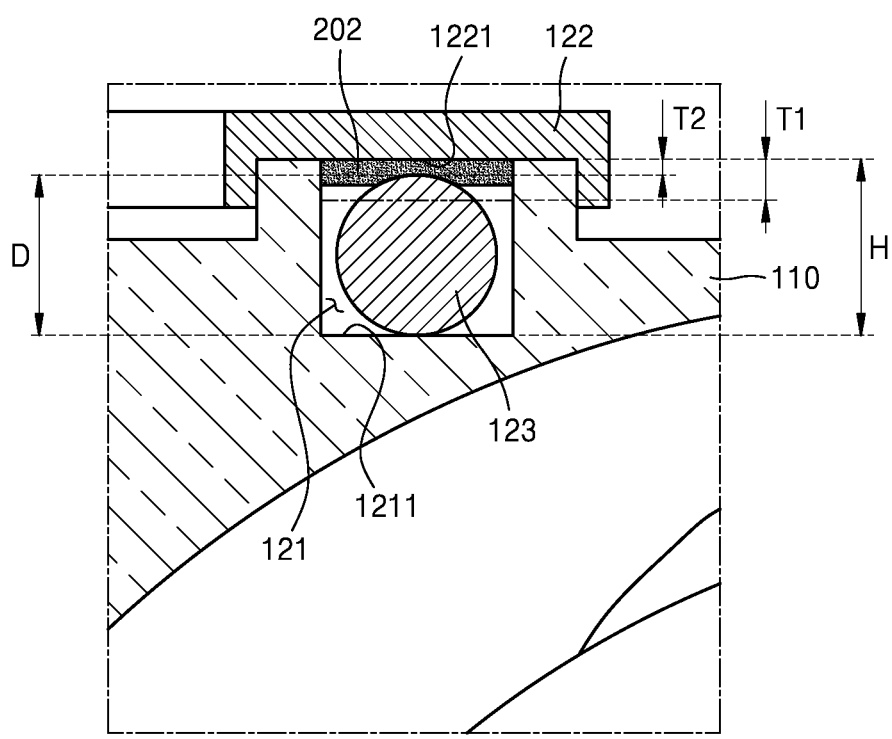
FIG. 8 is a cross-sectional view taken along a line VII-VII of FIG. 6.

FIGS. 6 and 7 are assembled perspective view and an exploded perspective view showing an impeller 100A having the fixing member 200 according to various embodiments of the disclosure, and FIG. 8 is a cross-sectional view of the impeller 100A of FIG. 6, cut along a line VIII-VIII.

Referring to FIGS. 6 through 8, the impeller 100A according to certain embodiments of the disclosure may include the body 110, the groove 121, a cover member 122A, the ball 123, and the fixing member 200. For the same component as the above-described embodiment of the disclosure, a redundant description will be omitted, and differences will be mainly described.

The impeller 100 may include a mark 1121 formed around the groove 121 or inside the groove 121. The mark 1121 may be provided in plural with different shapes to be distinguished from each other. In the drawings, numbers are indicated as examples of the mark 1121, but the disclosure is not limited thereto, and as long as they are distinguished from each other, various modifications may be made.

The mark 1121 may be used to identify the position of the ball 123 in the operation of manufacturing the motor assembly 10. In this regard, a method of manufacturing the motor assembly 10 will be described.

The fixing member 200 may be a pressing member 202 that fixes the position of the ball 123 by pressing the ball 123. A thickness T1 of the pressing member 202 before pressing the ball 123 may be greater than a difference (H−D) between the height H from the bottom surface 1211 of the groove 121 to the inner surface 1221 of the cover member 122A and the diameter D of the ball 123. In a process of the pressing member 202 pressing the ball 123, a thickness T2 of at least a part of the pressing member 202 may become equal to the difference between the height H from the bottom surface 1211 of the groove 121 to the inner surface 1221 of the cover member 122A and the diameter D of the ball 123 (T2=H−D).

The pressing member 202 may be disposed on the inner surface 1221 of the cover member 122. The pressing member 202 may be disposed in plural spaced apart from each other at equal intervals along a circumferential direction of the groove 121. Some of a plurality of pressing members 202 contact and press the ball 123 in a vertical direction, and the others may not contact the ball 123.

Figure 9:
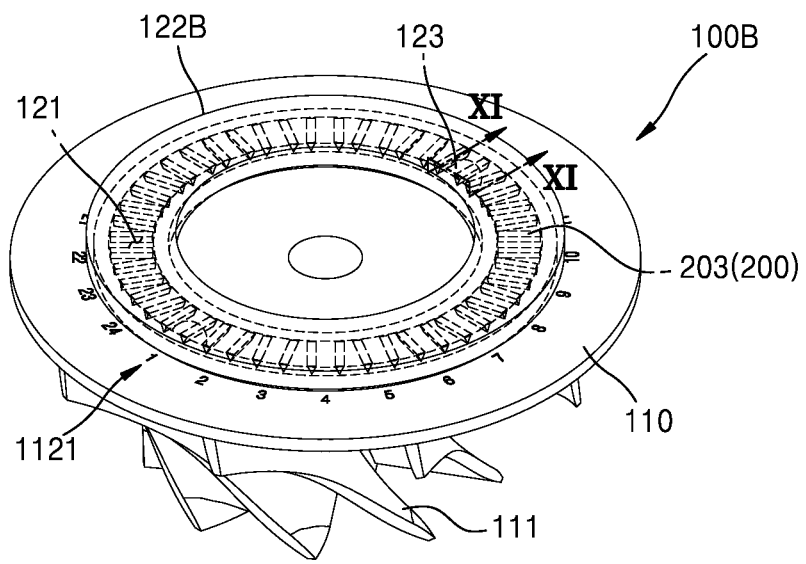
FIG. 9 is an assembled perspective view showing an impeller having a fixing member according to various embodiments of the disclosure.
Figure 10:
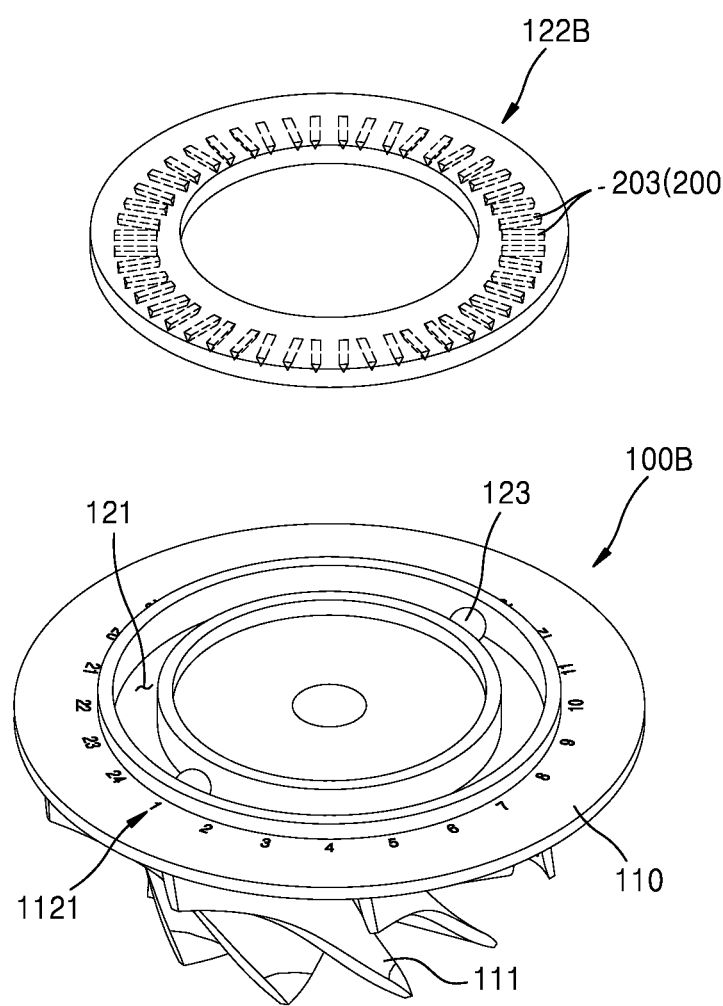
FIG. 10 is an exploded perspective view showing an impeller having a fixing member according to various embodiments of the disclosure.
Figure 11:
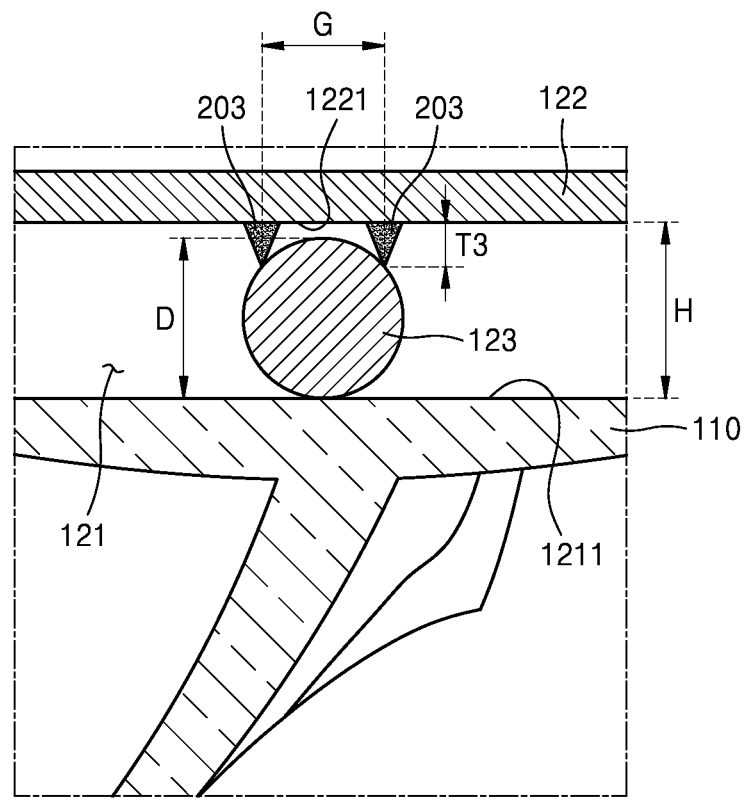
FIG. 11 is a cross-sectional view taken along a line XI-XI of FIG. 9.

FIGS. 9 and 10 are assembled perspective view and an exploded perspective view showing an impeller 100B having the fixing member 200 according to various embodiments of the disclosure, and FIG. 11 is a cross-sectional view of the impeller 100B, cut along a line XI-XI of FIG. 9.

Referring to FIGS. 9 through 11, the impeller 100B according to certain embodiments of the disclosure may include the body 110, the groove 121, a cover member 122B, the ball 123, and the fixing member 200. For the same component as the above-described embodiment of the disclosure, a redundant description will be omitted, and differences will be mainly described.

The fixing member 200 may include a pair of protrusions 203 formed on both sides of the ball 123 to prevent movement of the ball 123. The pair of protrusions 203 may be formed adjacent to the ball 123 to prevent movement of the ball 123. The pair of protrusions 203 may be two, without being limited thereto, and may be variously modified when the pair of protrusions 203 are of an even number.

The pair of protrusions 203 may be formed on the inner surface 1221 of the cover member 122B. For example, the plurality of protrusions 203 may protrude from the inner surface 1221 of the cover member 122B. The cover member 122B may have a ring shape that may cover the groove 121.

The plurality of protrusions 203 may be arranged at equal intervals in the circumferential direction of the groove 121. Some of the plurality of protrusions 203 are in contact with the ball 123 to limit positional movement of the ball 123, and the others may not contact the ball 123 and may not involve limiting the positional movement of the ball 123. The plurality of protrusions 203 may be paired by two, and a pair of paired protrusions 203 may be arranged in plural at equal intervals in the circumferential direction. The shape of the protrusion 203 may have a pointed end portion, but may have various shapes without being limited thereto.

A gap G between the pair of protrusions 203 may be greater than or equal to a radius (D/2) of the ball 123 and less than or equal to the diameter D of the ball 123. In addition, a height T3 of the pair of protrusions 203 may be greater than the difference (H−D) between the height H from the bottom surface 1211 of the groove 121 to the inner surface 1221 of the cover member 122B and the diameter D of the ball 123. For example, to stably block movement of the ball 123 by the protrusions 203, the height T3 of the pair of protrusions 203 may be greater by a length in a range from approximately 10% to approximately 20% of the diameter D of the ball 123 than the difference (H−D) between the height H from the bottom surface 1211 of the groove 121 to the inner surface 1221 of the cover member 122B and the diameter D of the ball 123 (H−D+0.1*D≤T3≤H−D+0.2*D).

Hereinafter, the method of manufacturing the motor assembly 10 having the impeller 100 will be described.

Figure 12:
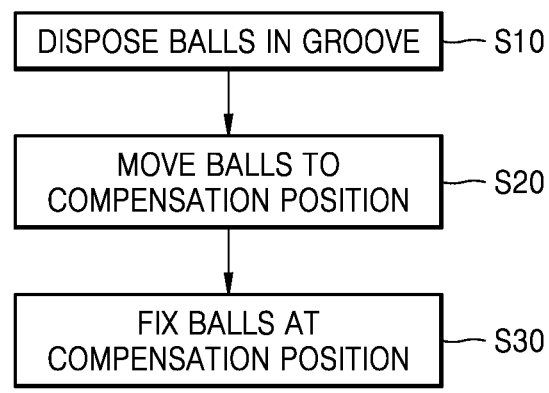
FIG. 12 is a flowchart illustrating a method of manufacturing a motor assembly, according to various embodiments of the disclosure.
Figure 13:
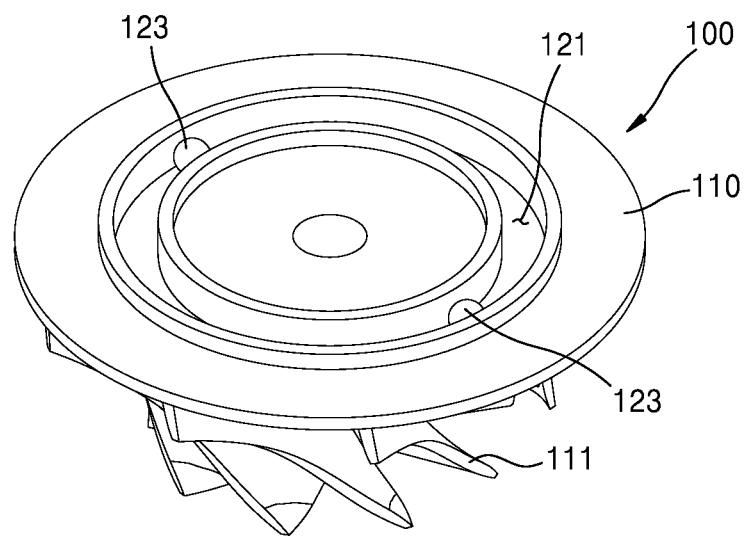
FIGS. 13 through 15 are diagrams for describing a method of manufacturing a motor assembly, according to various embodiments of the disclosure.
Figure 14:
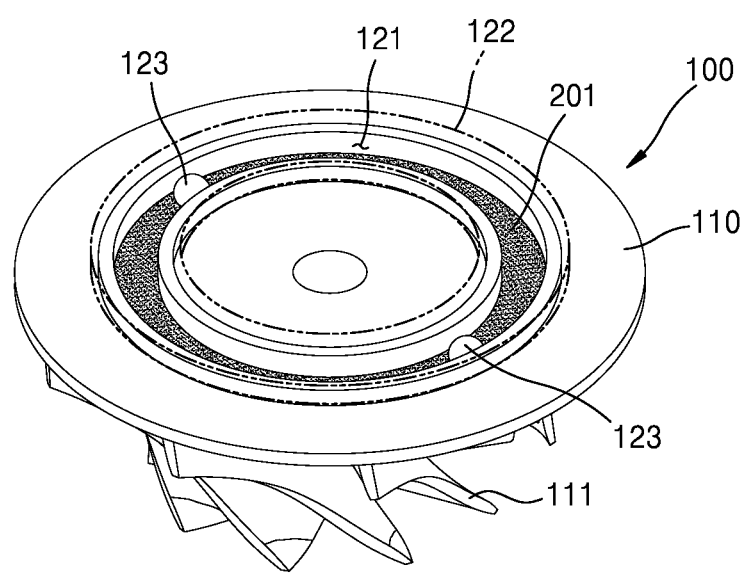
Figure 15:
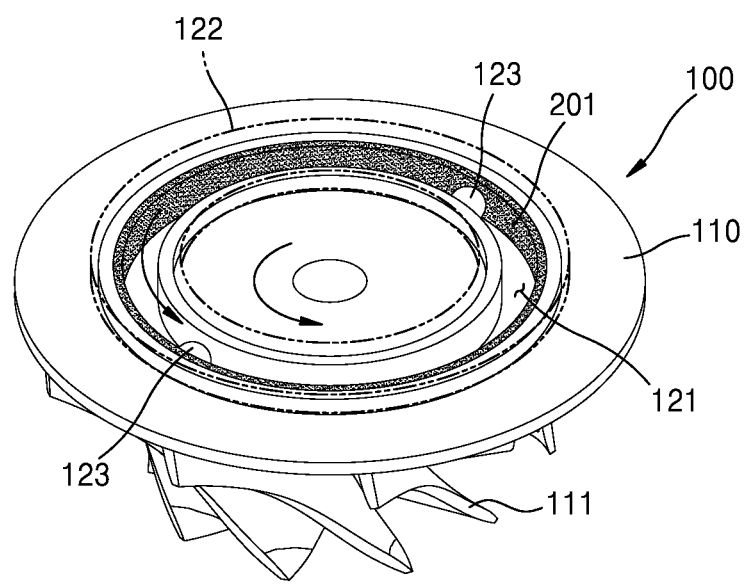
Figure 16:
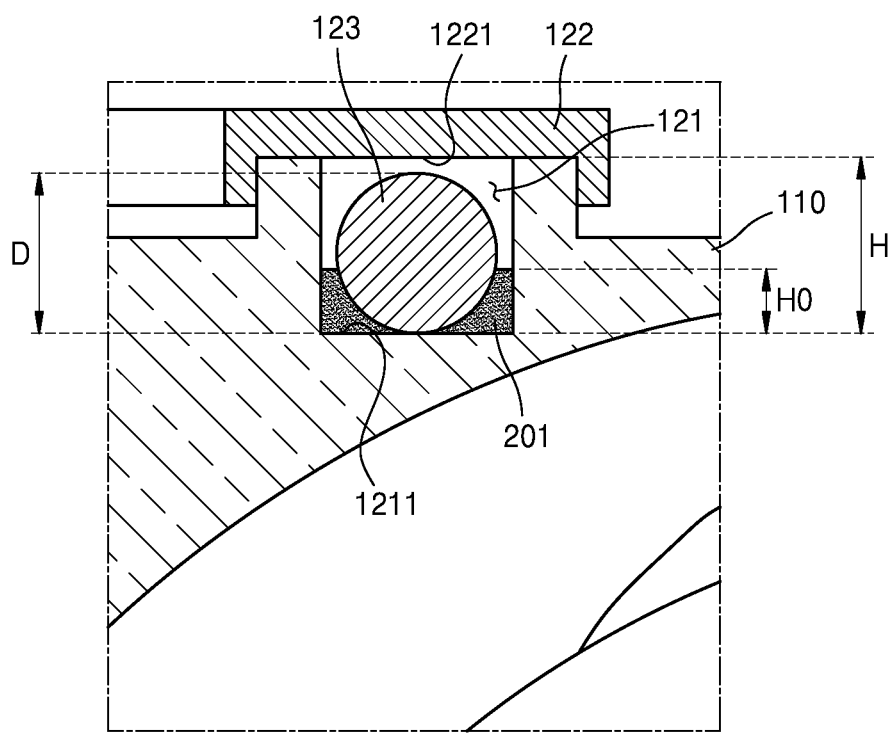
FIG. 16 is diagram showing partial cross-section of FIG. 14.
Figure 17:
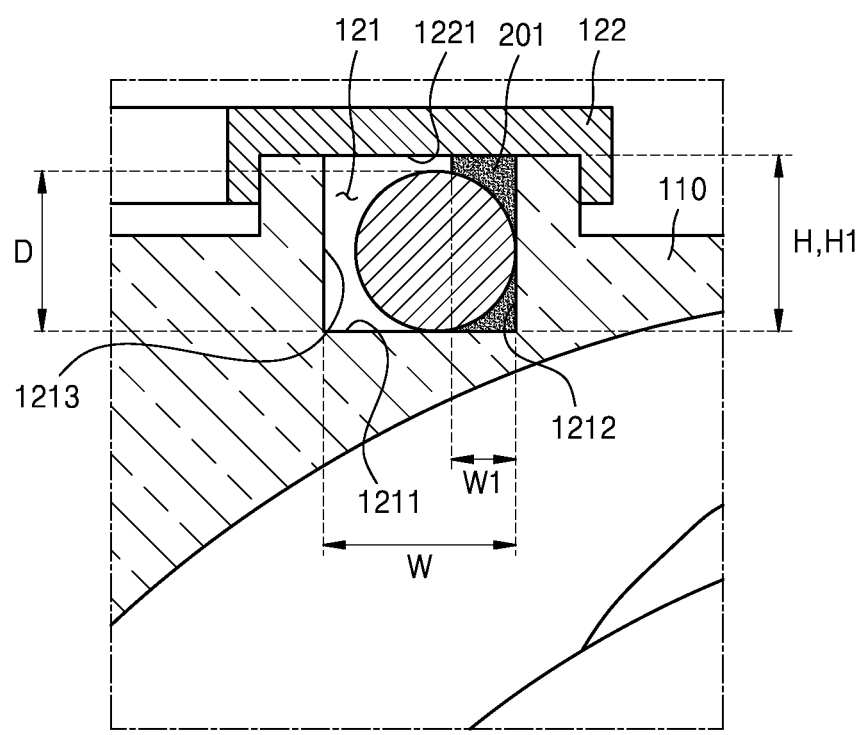
FIG. 17 is diagram showing partial cross-section of FIG. 15.

FIG. 12 is a flowchart illustrating a method of manufacturing the motor assembly 10, according to various embodiments of the disclosure. FIGS. 13 through 15 are diagrams for describing a method of manufacturing the motor assembly 10, according to various embodiments of the disclosure. FIGS. 16 and 17 are diagrams showing partial cross-sections of FIGS. 14 and 15. In FIGS. 14 and 15, for convenience of a description, the cover member 122 may be indicated by a dotted line.

Referring to FIGS. 12 and 13, the plurality of balls 123 may be disposed at random positions in the groove 121 in a ring shape, formed in a surface of the impeller 100, in operation S10. In this case, the impeller 100 may be in a state of being coupled to the rotation shaft 12 of the motor 11.

Referring to FIGS. 14 and 16, before the impeller 100 is rotated, the flowable adhesive 201 may be injected into the groove 121. That is, the adhesive 201 in a state before being hardened may be injected into the groove 121.

As a method of injecting the adhesive 201, the adhesive 201 may be injected, through an injection hole (not shown) of the cover member 122 or before the cover member 122 is coupled.

The adhesive 201 is in a flowable state, such that a lower portion of the ball 123 may be immersed in the adhesive 201. A height H0 of the adhesive 201 injected into the groove 121 may be in a range from approximately 30% to approximately 50% of the diameter D of the ball 123. When the amount of the injected adhesive 201 exceeds approximately 50%, the adhesive 201 may leak out of the groove 121 during rotation of the impeller 100. When the amount of the injected adhesive 201 is less than approximately 30%, a function of fixing the ball 123 in a subsequent operation may not be suitably performed.

Referring to FIGS. 13 and 15, the impeller 100 may be rotated at a speed greater than a resonant rotation speed. The ball 123 may be moved to a compensation position for compensating for an eccentricity in the motor assembly 10, in operation S20. When the impeller 100 is not in the state of being coupled to the motor 11 of the motor assembly 10, the compensation position of the ball 123 may be a position for compensating for an eccentricity in the impeller 100.

At the beginning of rotation of the impeller 100, the adhesive 201 is in a flowable state, such that the adhesive 201 and the ball 123 may start to move together in a radial direction. As the impeller 100 is rotated at a speed greater than a resonant rotation speed, the ball 123 may move from a random position in the groove 121 to the compensation position for compensating for eccentricity. At this time, the adhesive 201 may move to the outer circumferential wall 1212 of the groove 121 by a centrifugal force, as shown in FIG. 17.

As such, in a state where the ball 123 is moved to the compensation position, the position of the ball 123 may be fixed in operation S30. For example, when the adhesive 201 is used as the fixing member 200, the rotation speed of the impeller 100 may be maintained until the adhesive 201 in the flowable state is hardened.

When the adhesive 201 is hardened, the ball 123 may be fixed at the compensation position in the groove 121 even when rotation of the impeller 100 is stopped. The width W1 of the hardened adhesive 201 may be in a range from approximately 30% to approximately 50% of the width W of the groove 121.

In the above-described embodiment of the disclosure, an example of fixing the ball 123 at the compensation position by using the adhesive 201 has been described. However, a method of fixing the ball 123 at the compensation position may not be limited thereto, and may be variously modified.

FIGS. 18 through 22 are diagrams for describing a method of manufacturing the motor assembly 10, according to various embodiments of the disclosure.

Figure 18:
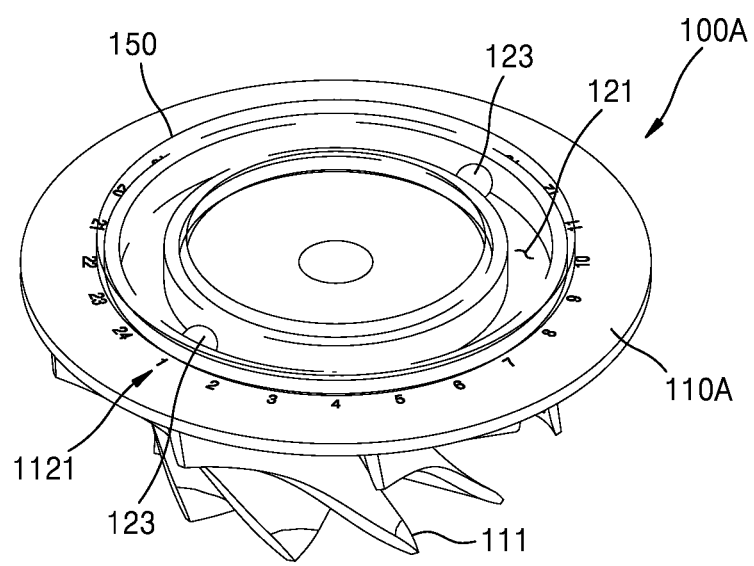
FIG. 18 is diagram for describing a method of manufacturing a motor assembly, according to various embodiments of the disclosure.

Referring to FIG. 18, the plurality of balls 123 may be formed at random positions in the groove 121, and before rotation of the impeller 100A, a transparent cover 150, which is transparent to allow the position of the ball 123 in the groove 121 to be identified, may be formed to cover the groove 121.

Thereafter, when the impeller 100A is rotated at a speed greater than a resonant rotation speed, the ball 123 may be moved to the compensation position for compensating for eccentricity. The inside of the groove 121 may be identified through the transparent cover 150, thus determining where the compensation position of the ball 123 is.

Figure 19:
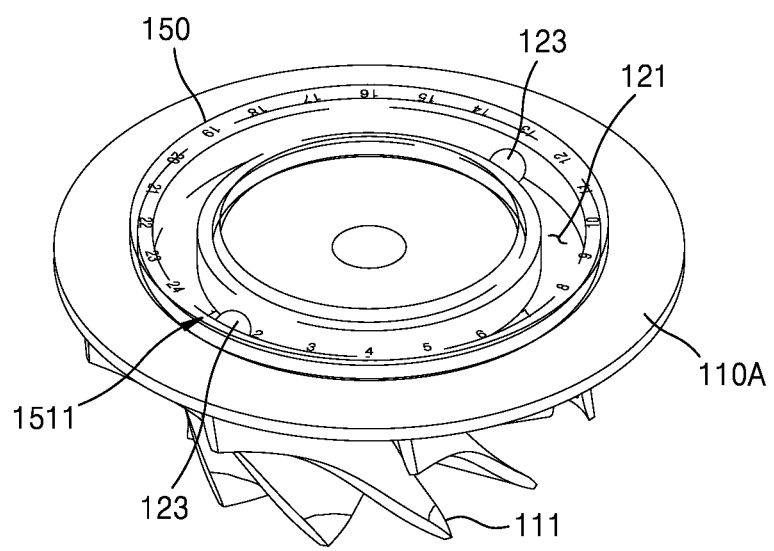
FIG. 19 is diagram for describing a method of manufacturing a motor assembly, according to various embodiments of the disclosure.

In at least one of the impeller 100A or the transparent cover 150, the mark 1121 that may determine the position of the ball 123 may be formed. For example, as shown in FIG. 18, it is possible to determine where the compensation position of the ball 123 is, through the mark 1121 formed in a surface of the impeller 100A. For example, as shown in FIG. 19, it is possible to determine where the compensation position of the ball 123 is, through a mark 1121 formed in the transparent cover 150.

The impeller 100A is in a state of rotating at s high speed, such that a device for identifying the position of the ball 123 inside the groove 121 of the impeller 100A may be used. For example, the compensation position of the ball 123 in the groove 121 of the rotating impeller 100A may be identified through a high-speed camera. For example, the compensation position of the ball 123 in the groove 121 of the impeller 100A may be identified through a stroboscope.

Figure 20:
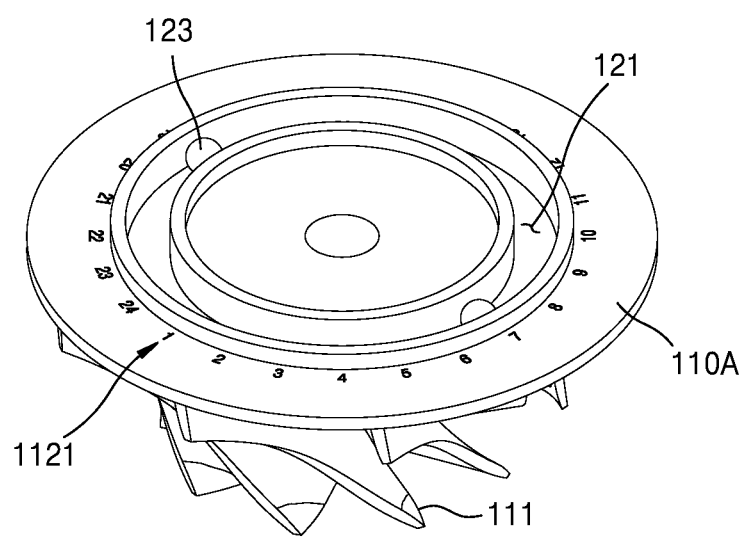
FIG. 20 is diagram for describing a method of manufacturing a motor assembly, according to various embodiments of the disclosure.

Referring to FIG. 20, rotation of the impeller 100A may be stopped and the transparent cover 150 may be removed. Next, the ball 123 may be moved to the compensation position identified using the mark 1121.

Figure 21:
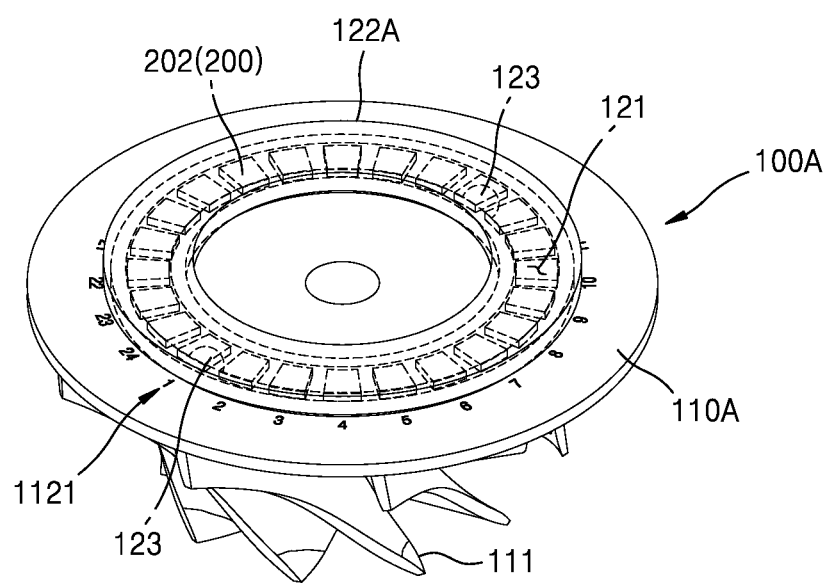
FIG. 21 is diagram for describing a method of manufacturing a motor assembly, according to various embodiments of the disclosure.
Figure 22:
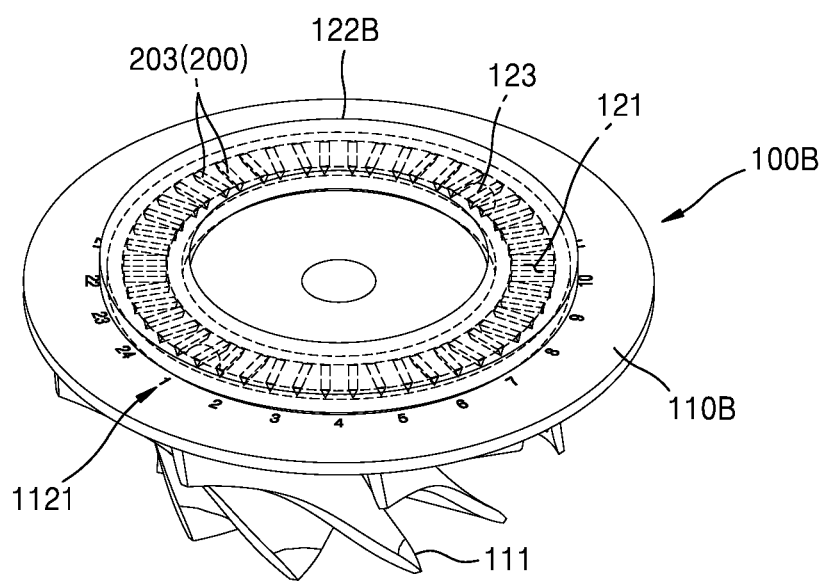
FIG. 22 is diagram for describing a method of manufacturing a motor assembly, according to various embodiments of the disclosure.

Referring to FIGS. 21 and 22, the cover member 122A having the fixing member 200 formed thereon may cover the groove 121, such that the ball 123 may be fixed at the compensation position by the fixing member 200. The fixing members 200 may be formed on the inner surface 1221 of the cover member 122A, and may be formed spaced apart from each other at equal intervals in the circumferential direction. By disposing the fixing member 200 at equal intervals in the circumferential direction, it is possible to prevent eccentricity due to addition of the fixing member 200.

As shown in FIGS. 8 and 21, the fixing member 200 may be the pressing member 202 that fixes the position of the ball 123 by pressing the ball 123. A thickness of the pressing member 202 before pressing the ball 123 may be greater than a difference between a height from the bottom surface 1211 of the groove 121 to the inner surface 1221 of the cover member 122A and the diameter of the ball 123.

As shown in FIGS. 11 and 22, the fixing member 200 may include the pair of protrusions 203 formed on both sides of the ball 123 to prevent positional movement of the ball 123. A gap between the pair of protrusions 203 may be greater than or equal to a radius of the ball 123 and less than or equal to the diameter of the ball 123. The pair of protrusions 203 may have a height higher by a length of approximately 10% to approximately 20% of the diameter of the ball 123 than the difference between the height from the bottom surface 1211 of the groove 121 to the inner surface 1221 of the cover member 122B and the diameter of the ball 123.

As such, in the process of manufacturing the motor assembly 10, the eccentricity in the motor assembly 10 or the impeller 100, 100A, or 100B may be compensated for in a short time through a simple operation of fixing the ball 123 at the compensation position. For example, the eccentricity in the motor assembly 10 or the impeller 100, 100A, or 100B may be compensated for within 25 minutes.

In the above-described embodiments of the disclosure, the motor assembly 10 used in the vacuum cleaner 1 has been mainly described, but a device to which the motor assembly 10 is applied may not be necessarily limited thereto.

Reference numerals have been used in exemplary embodiments illustrated in the attached drawings to help understanding of the disclosure, and particular terms have been used to describe the embodiments of the disclosure, but the disclosure is not limited to the particular terms, and the disclosure may include any element that may be generally conceived by those of ordinary skill in the art.

The particular implementations shown and described herein are illustrative examples of the disclosure and are not intended to otherwise limit the scope of the disclosure in any way. For the sake of brevity, electronics according to the related art, control systems, software development and other functional aspects of the systems may not be described in detail. Furthermore, the connecting lines, or connectors shown in the various figures presented are intended to represent exemplary functional relationships and/or physical or logical couplings between the various elements. Moreover, no item or component is essential to the practice of the disclosure unless the element is specifically described as "essential" or "critical". As used herein, the expressions "comprising", "including", etc. may be used to be understood as terms of an open end of the description.

In the disclosure (especially, in the claims), the use of "the" and other demonstratives similar thereto may correspond to both a singular form and a plural form. Also, when a range is described in the disclosure, the range may include examples adopting any individual element within the range (unless described otherwise), and may have written each individual element included in the range in the detailed description of the disclosure. Unless the order of operations of a method according to the disclosure is explicitly mentioned or described otherwise, the operations may be performed in a proper order. The order of the operations is not limited to the order the operations are mentioned. The use of all examples or exemplary terms (e.g., "etc.,", "and (or) the like", and "and so forth") is merely intended to describe the disclosure in detail, and the scope is not necessarily limited by the examples or exemplary terms unless defined by the claims. Moreover, it would be clearly understood by those of ordinary skill in the art that various modifications and changes may be easily made without departing from the scope and spirit of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of manufacturing a motor assembly comprising a motor and an impeller coupled to a rotation shaft of the motor, the method comprising:
   disposing a plurality of balls in a ring-shaped groove formed in a surface of the impeller;
   disposing a transparent cover to cover the groove and to allow identifying a position of the balls inside the groove;
   rotating the impeller at a speed greater than a resonant rotation speed of the impeller to move the balls to a compensation position for compensating for an eccentricity in the motor assembly;
   identifying the compensation position of the balls through the transparent cover by rotating the impeller at the speed greater than the resonant rotation speed, using at least one of a high-speed camera or a stroboscope; and
   fixing the balls so that the balls are maintained at the compensation position in the groove,
   wherein the fixing of the balls at the compensation position comprises:
   removing the transparent cover after stopping the impeller;
   moving the balls to the compensation position in the groove; and
   fixing the balls at the compensation position using a fixing member by covering the groove with a cover member in which the fixing member is formed,
   wherein the fixing member comprises a pressing member that fixes the position of the balls by pressing the balls.

2. The method of claim 1, wherein fixing the balls at the compensation position comprises using an adhesive to fix the balls at the compensation position.

3. The method of claim 2, further comprising injecting the adhesive into the groove before the impeller is rotated, and
   wherein the fixing of the balls at the compensation position comprises maintaining a rotation speed of the impeller until the adhesive is hardened with the balls fixed in the compensation position.

4. The method of claim 1, wherein the fixing member is spaced apart at equal intervals in a circumferential direction of the groove.

5. The method of claim 1, wherein a thickness of the pressing member before pressing the balls is greater than a difference between a height from a bottom surface of the groove to an inner surface of the cover member and a diameter of the balls.

6. A method of manufacturing a motor assembly comprising a motor and an impeller coupled to a rotation shaft of the motor, the method comprising:
   disposing a plurality of balls in a ring-shaped groove formed in a surface of the impeller;
   disposing a transparent cover to cover the groove and to allow identifying a position of the balls inside the groove;
   rotating the impeller at a speed greater than a resonant rotation speed of the impeller to move the balls to a compensation position for compensating for an eccentricity in the motor assembly;
   identifying the compensation position of the balls through the transparent cover by rotating the impeller at the speed greater than the resonant rotation speed, using at least one of a high-speed camera or a stroboscope; and
   fixing the balls so that the balls are maintained at the compensation position in the groove,
   wherein the fixing of the balls at the compensation position comprises:
   removing the transparent cover after stopping the impeller;
   moving the balls to the compensation position in the groove; and
   fixing the balls at the compensation position using a fixing member by covering the groove with a cover member in which the fixing member is formed,
   wherein the fixing member comprises a plurality of protrusions that protrude from an inner surface of the cover member and are arranged at equal intervals in a circumferential direction,
   wherein a pair of protrusions adjacent to each other among the plurality of protrusions are formed on both sides of the balls to limit positional movement of the balls,
   wherein a gap between the pair of protrusions is greater than or equal to a radius of the balls and less than or equal to a diameter of the balls, and
   wherein a height of a protrusion of the pair of protrusions from an inner surface of the cover member is greater by a length of 10% to 20% of the diameter of the balls than a difference between a height from a bottom surface of the groove to an inner surface of the cover member and the diameter of the balls.

7. A motor assembly comprising:
a motor; and
an impeller coupled to a rotation shaft of the motor,
wherein the impeller comprises:
   a body comprising a blade, and a ring-shaped groove formed in a surface of the body;
   a cover member configured to cover the groove;
   a plurality of balls disposed inside the groove; and
   a fixing member configured to fix the balls so that positions of the balls are maintained inside the groove,
wherein the fixing member comprises a plurality of protrusions that protrude from an inner surface of the cover member and are arranged at equal intervals in a circumferential direction,
wherein a pair of protrusions adjacent to each other among the plurality of protrusions are formed on both sides of the balls to limit positional movement of the balls, and
wherein a gap between the pair of protrusions is greater than or equal to a radius of the balls and less than or equal to a diameter of the balls.

8. The motor assembly of claim 7, wherein the fixing member comprises an adhesive configured to adhere the balls to an inside of the groove.

9. The motor assembly of claim 8, wherein the adhesive is disposed on an outer circumferential wall inside the groove.

10. The motor assembly of claim 7, wherein the fixing member is disposed on an inner surface of the cover member and is spaced apart at equal intervals in the circumferential direction of the groove.

11. The motor assembly of claim 7, wherein the fixing member comprises a pressing member configured to fix a position of the balls by pressing the balls.

12. The motor assembly of claim 11, wherein a thickness of the pressing member before pressing the balls is greater than a difference between a height from a bottom surface of the groove to an inner surface of the cover member and the diameter of the balls.

13. The motor assembly of claim 7, wherein a height for a protrusion of the pair of protrusions from an inner surface of the cover member is greater by a length in a range from 10% to 20% of the diameter of the balls than a difference between a height from a bottom surface of the groove to an inner surface of the cover member and the diameter of the balls.

14. A vacuum cleaner comprising a motor assembly, wherein:
the motor assembly comprises a motor and an impeller coupled to a rotation shaft of the motor, and
the impeller comprises:
   a body including a ring-shaped groove formed in a surface of the body;
   a cover member configured to cover the groove;
   a plurality of balls disposed inside the groove; and
   a fixing member configured to fix the balls inside the groove,
wherein the fixing member comprises a plurality of protrusions that protrude from an inner surface of the cover member and are arranged at equal intervals in a circumferential direction,
wherein a pair of protrusions adjacent to each other among the plurality of protrusions are formed on both sides of the balls to limit positional movement of the balls, and
wherein a gap between the pair of protrusions is greater than or equal to a radius of the balls and less than or equal to a diameter of the balls.

* * * * *